United States Patent [19]
Takato et al.

[11] Patent Number: 5,311,518
[45] Date of Patent: May 10, 1994

[54] ISDN INTERFACE CIRCUIT AND SYSTEM USING THE SAME

[75] Inventors: Kenji Takato, Kawasaki; Yozo Iketani; Takashi Sato, both of Yokohama; Hiroyuki Ujiie, Hiratsuka; Seiji Miyoshi, Yokohama, all of Japan

[73] Assignee: Fujitsu Limited, Kawasaki, Japan

[21] Appl. No.: 684,272

[22] Filed: Apr. 12, 1991

[30] Foreign Application Priority Data

Apr. 16, 1990 [JP] Japan .................................. 2-97495

[51] Int. Cl.[5] .............................................. H04J 3/12
[52] U.S. Cl. ...................................... 370/110.1; 379/402
[58] Field of Search ................. 370/110.1, 5; 379/402, 379/405, 377, 380, 385, 399; 340/310 R

[56] References Cited

U.S. PATENT DOCUMENTS

| | | | |
|---|---|---|---|
| 3,987,253 | 10/1976 | Pipitone | 370/402 |
| 4,322,586 | 3/1982 | Mein et al. | 379/377 |
| 4,797,904 | 1/1989 | Dekker et al. | 375/60 |
| 4,884,269 | 11/1989 | Duncanson et al. | 370/110.1 |
| 4,905,237 | 2/1990 | Voelzke | 370/110.1 |
| 5,113,396 | 5/1992 | Kagami | 370/110.2 |

FOREIGN PATENT DOCUMENTS 57-181251  1/1982  Japan .

Primary Examiner—Stephen Chin
Assistant Examiner—T. Ghebretinsae
Attorney, Agent, or Firm—Staas & Halsey

[57] ABSTRACT

An ISDN interface circuit is provided which is coupled to a terminal device via a transmission line and a reception line, the transmission line being formed of a pair of first and second wires, and the reception line being formed of a pair of third and fourth wires. The ISDN interface circuit includes a first resistor and a second resistor connected in series at a first node and between the first and second wires of the transmission line, and a third resistor and a fourth resistor connected in series at a second node and between the third and fourth wires of the reception line. The ISDN interface circuit also includes a D.C. power source connected to one of the first node, at which the first resistor and the second resistor are mutually connected in series and the second node, at which the third resistor and the fourth resistor are mutually connected in series. One of the first node and the second node, other than the above-mentioned one of the first node and the second node connected to the D.C. power source, is grounded.

12 Claims, 8 Drawing Sheets

5,311,518

ISDN INTERFACE CIRCUIT AND SYSTEM USING THE SAME

BACKGROUND OF THE INVENTION

The present invention generally relates to an ISDN (Integrated Services Digital Network) interface circuit having a function of feeding electrical power to terminal devices.

An interface circuit on the side of a network terminator in layer 1 (physical layer) in an ISDN is defined as being equipped with a phantom feed function of feeding power to terminal devices connected to the interface circuit.

STATE OF THE RELATED ART

FIG. 1 shows a conventional ISDN interface circuit 56 connected to a terminal device 50. The ISDN interface circuit 56 comprises of a control circuit 60, driving transistors 61 and 62, resistors 63, 64 and 68, a D.C. power source 65, two terminating resistors 69 and 70, a transmission transformer 57, a reception transformer 58, a power feed circuit 59 and two comparators 66 and 67. The terminal device 50 comprises a power receiving circuit 51, a reception transformer 52 and a transmission transformer 53.

The power feed circuit 59 functions to feed power to the terminal device 50, and outputs a voltage equal to, for example, 40 volts, to intermediate points of the transmission and reception transformers 57 and 58. The power receiving circuit 51 of the terminal device 50 is connected to an intermediate point of the reception transformer 52 and an intermediate point of the transmission transformer 53. Power is supplied to the power receiving circuit 51 from the power feed circuit 59 via a two-wire transmission line 54 and a two-wire reception line 55. The power receiving circuit 51 supplies the received power to an internal circuit (not shown) in the terminal device 50.

Currents pass through each of the transformers 52, 53, 57 and 58 in two directions from the intermediate point, so that magnetic fluxes generated by the currents are canceled and the transformers are prevented from being magnetically saturated. The power feed circuit 59 has a normal power feeding mode and a limited power feeding mode, and has a function of informing, by a polarity inversion, the terminal device 50 of whether one of the two modes is selected.

Transmission (send) data SD is input to the control circuit 60, which turns ON either the driving transistor 61 or the driving transistor 62 when the transmission data SD is equal to "0". On the other hand, when the transmission data SD is equal to "1", neither the driving transistor 61 nor the driving transistor 62 are turned OFF by the control circuit 60. For example, when the driving transistor 61 is turned ON, a current passes from the power source 65, equal to 5 volts relative to the ground potential through a first primary winding of the transmission transformer 57, the resistor 63 and the driving transistor 61. On the other hand, when the driving transistor 62 is turned ON, a current passes from the power source 65 to the ground through a second primary winding of the transmission transformer 57, the resistor 64 and the driving transistor 62. In these alternative conditions, the current flows in respective, alternate directions through the primary winding of the transmission transformer 57, so that an AMI (Alternate Mark Inversion) signal is induced in the secondary winding of the transmission transformer 57. The induced AMI signal is sent to the terminal device 50 via the transmission line 54, and input to an internal circuit (not shown) of the terminal device 50 via the reception transformer 52 thereof.

The AMI signal output by the internal circuit 51 of the terminal device 50 is output to the reception line 55 via the transmission transformer 53, and then input to the ISDN interface circuit 56. The AMI signal flows in respective, alternate directions through the primary winding of the receive transformer 58, so that a voltage is induced in a secondary winding of the reception transformer 58. The induced voltage is input to the comparators 66 and 67 via the resistor 68, and compared with a reference voltage $V_T$. The comparator 66 outputs a positive pulse detection signal $+RD$, and the comparator 67 outputs a negative pulse detection signal $-RD$. Normally, each of the terminating resistors 69 and 70 has a resistance equal to 100 ohms.

However, the transformers 57 and 58 are expensive and are not suitable for use as elements to be formed in an LSI device. Thus, it is impossible to produce a less-expensive, compact ISDN interface circuit in the form of LSI.

SUMMARY OF THE PRESENT INVENTION

It is an object of the present invention to provide a less-expensive and compact ISDN interface circuit, which neither requires nor employs a transformer.

This object of the present invention is achieved by an ISDN interface circuit coupled to a terminal device via a transmission line and a reception line, the transmission line being formed of a pair of first and second wires, and the reception line being formed of a pair of third and fourth wires, the ISDN interface circuit comprising:

a first resistor and a second resistor connected in series between the first and second wires of the transmission line;

a third resistor and a fourth resistor connected in series between the third and fourth wires of the reception line; and a D.C. power source connected to one of a first node, at which the first resistor and the second resistor are mutually connected, and a second node, at which the third resistor and the fourth resistor are mutually connected; further, one of the first node and the second node, other than the one of the first node and the second node connected to the D.C. power source, is grounded.

Another object of the present invention is to provide a system using the above-mentioned ISDN interface circuit.

This object of the present invention is achieved by a system having an ISDN interface circuit and a terminal device, the ISDN interface circuit being coupled to the terminal device via a transmission line and a reception line, the transmission line being formed of a pair of first and second wires, and the reception line being formed of a pair of third and fourth wires, the ISDN interface circuit comprising:

a first resistor and a second resistor connected in series between the first and second wires of the transmission line;

a third resistor and a fourth resistor connected in series between the third and fourth wires of the reception line;

a D.C. power source connected to one of a first node, at which the first resistor and the second resistor are mutually connected, and a second node, at which the third resistor and the fourth resistor are mutually connected; further, one of the first node and the second node, other than the one of the first node and the second nodes connected to the D.C. power source is grounded and wherein, the terminal device comprises power receiving means, coupled to the transmission line and the reception line, for receiving power supplied from the ISDN interface circuit via the transmission line and for outputting the power to an internal circuit of the terminal device.

BRIEF DESCRIPTION OF THE DRAWINGS

The foregoing and other objects, features and advantages of the present invention will become more apparent from the following detailed description when read in conjunction with the accompanying drawings, in which.

DESCRIPTION OF THE PREFERRED EMBODIMENTS

Figure 1:
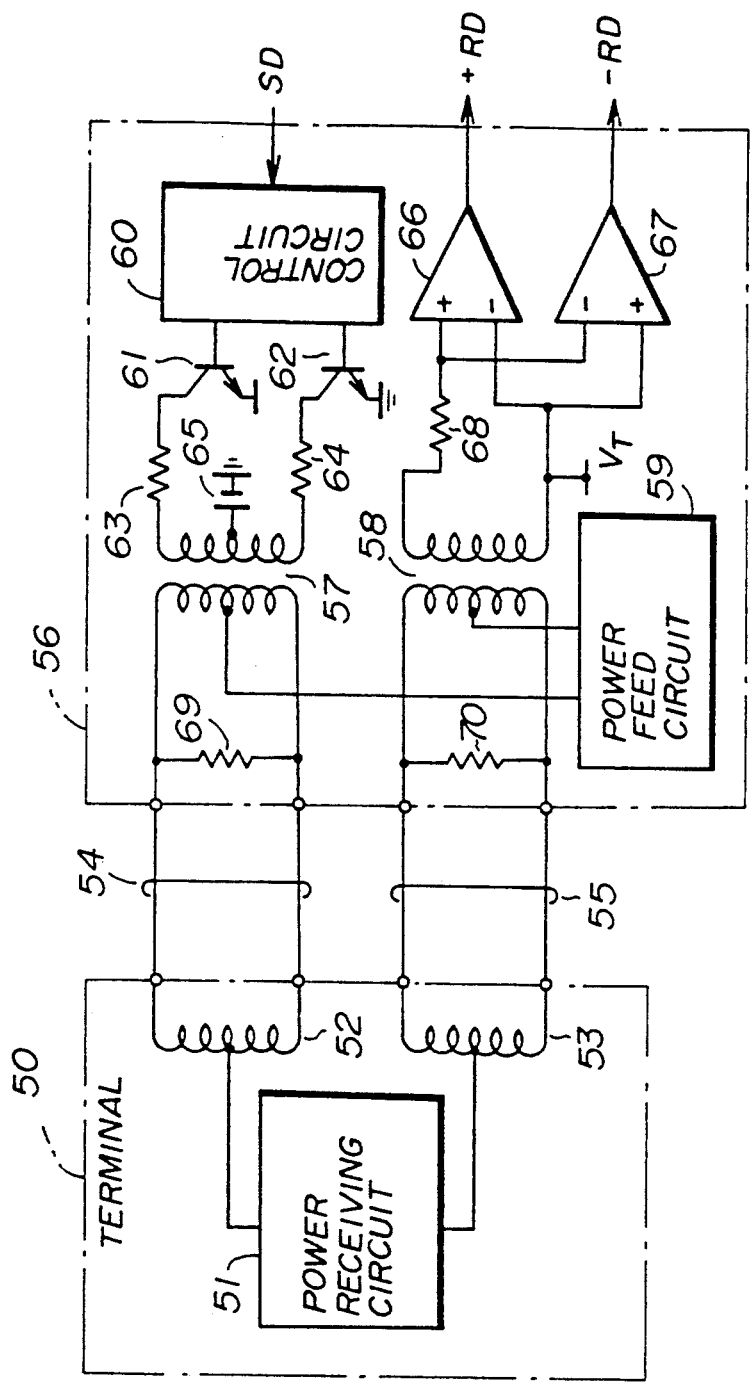
FIG. 1 is a block diagram of a conventional ISDN interface circuit.

A description will now be given of the principle of the present invention with reference to FIG. 2. An ISDN interface circuit shown in FIG. 2 comprises a transmission circuit 1, a reception circuit 2 and a power feed circuit 6. The power feed circuit 6 includes first and second resistors 7 and 8 connected in series between two wires of a transmission line 3. Each of the first and second resistors 7 and 8 has resistance substantially equal to half of the line terminating resistance. A connection node at which the resistors 7 and 8 are connected in series is grounded. Further, the power feed circuit 6 includes third and fourth resistors 9 and 10 connected in series between two wires of a reception line 4. Each of the first and second resistors 9 and 10 has a resistance substantially equal to half of the line terminating resistance. Moreover, the power feed circuit 6 includes a D.C. power source 11 having a cathode terminal connected to a connection node at which the resistors 9 and 10 are connected in series, and an anode grounded.

The transmission circuit 1 includes driving transistors 12, 13, 14 and 15 of the bipolar type, a control circuit 18, and two resistors 16 and 17. The control circuit 18 receives transmission data SD from an internal circuit (not shown for the sake of simplicity) and controls the bases of the driving transistors 12-15 in accordance with the transmission data SD. The driving transistors 12 and 13, which are formed of complementary bipolar transistors, form a complementary driving circuit, and the transistors 14 and 15, which are formed of complementary transistors, form a complementary driving circuit. The emitter of the driving transistor 12 is connected to a power supply line set to a positive voltage $V_C$, and the emitter of the driving transistor 13 is connected to a power supply line set to a negative voltage $V_E$. Similarly, the emitters of the driving transistors 14 and 15 are connected to the $V_C$ and $V_E$ power supply lines, respectively. The collectors of the driving transistors 12 and 13 are coupled to one of the two wires of the transmission line 3 via the resistor 16. Similarly, the collectors of the driving transistors 14 and 15 are connected to the other wire of the transmission line 3 via the resistor 17.

The reception circuit 2 has two comparators (COMP) 27 and 28, and resistors 19-26. The resistors 19 and 21 function to voltage-divide the difference between the voltage of the one of the two wires of the reception line 4 and a reference voltage $V_T$, and the resistors 20 and 22 function to voltage-divide the difference between the voltage of the other wire of the reception line 4 and the reference voltage $V_T$. The resistors 23 and 25 function to voltage-divide the voltage of one of the wires of the reception line 4 and the reference voltage $V_T$. The resistors 24 and 26 function to voltage-divide the voltage of the other wire of the reception line 4 and the reference voltage $V_T$.

Currents from the ground pass through the resistors 7 and 8 and the two wires of the transmission line 3, and are then input to a terminal device 5. Currents from the terminal device 5 pass through the two wires of the reception line 4 and the resistors 9 and 10, and are then input to the power source 11. Thus, the terminating resistance of the transmission line 3 is afforded by the resistors 7 and 8 connected in series, and the terminating resistance of the reception line 4 afforded by the resistors 9 and 10 connected in series. In the above-mentioned way, the terminal device 5 is supplied with power from the ISDN interface circuit.

The resistors 7-10 are formed of, for example, polysilicon thin film resistors. In order to prevent the generation of an offset voltage, it is preferable that each of the resistors has a substantially identical resistance.

As an example of operation, when the control circuit 18 turns ON, the driving transistors 12 and 15 on the basis of the transmission data SD, a positive pulse is generated and output to the transmission line 3. On the other hand, when the control circuit 18 turns ON the driving transistors 13 and 14 on the basis of the transmission data SD, a negative pulse is generated and output to the transmission line 3. In this way, an AMI signal can be generated. The resistors 16 and 17 are provided for preventing the impedance, obtained when the pulse is output, from becoming zero.

The reception circuit 2 divides the difference between the reference voltage $V_T$ and the voltage of one of the two wires of the reception line 4 by the resistors 19 and 21, and divides the difference between the reference voltage $V_T$ and the voltage of the other wire of the reception line 4 by the resistors 20 and 22. Two divided voltages are compared by the comparator 27, which, when detecting a positive pulse, outputs a positive pulse detection signal $+RD$. Further, the reception circuit 2 divides the difference between the reference voltage $V_T$ and the voltage of one of the two wires of the reception line 4 by the resistors 23 and 25, and divides the difference between the reference voltage $V_T$ and the voltage of the other wire of the reception line 4 by the resistors 24 and 26. The two, thus divided, voltages are compared by the comparator 28, which when detecting a negative pulse, outputs a negative pulse detection signal $-RD$. It will be noted that the present embodiment is capable of detecting positive and negative pulses without using a transformer.

Figure 3:
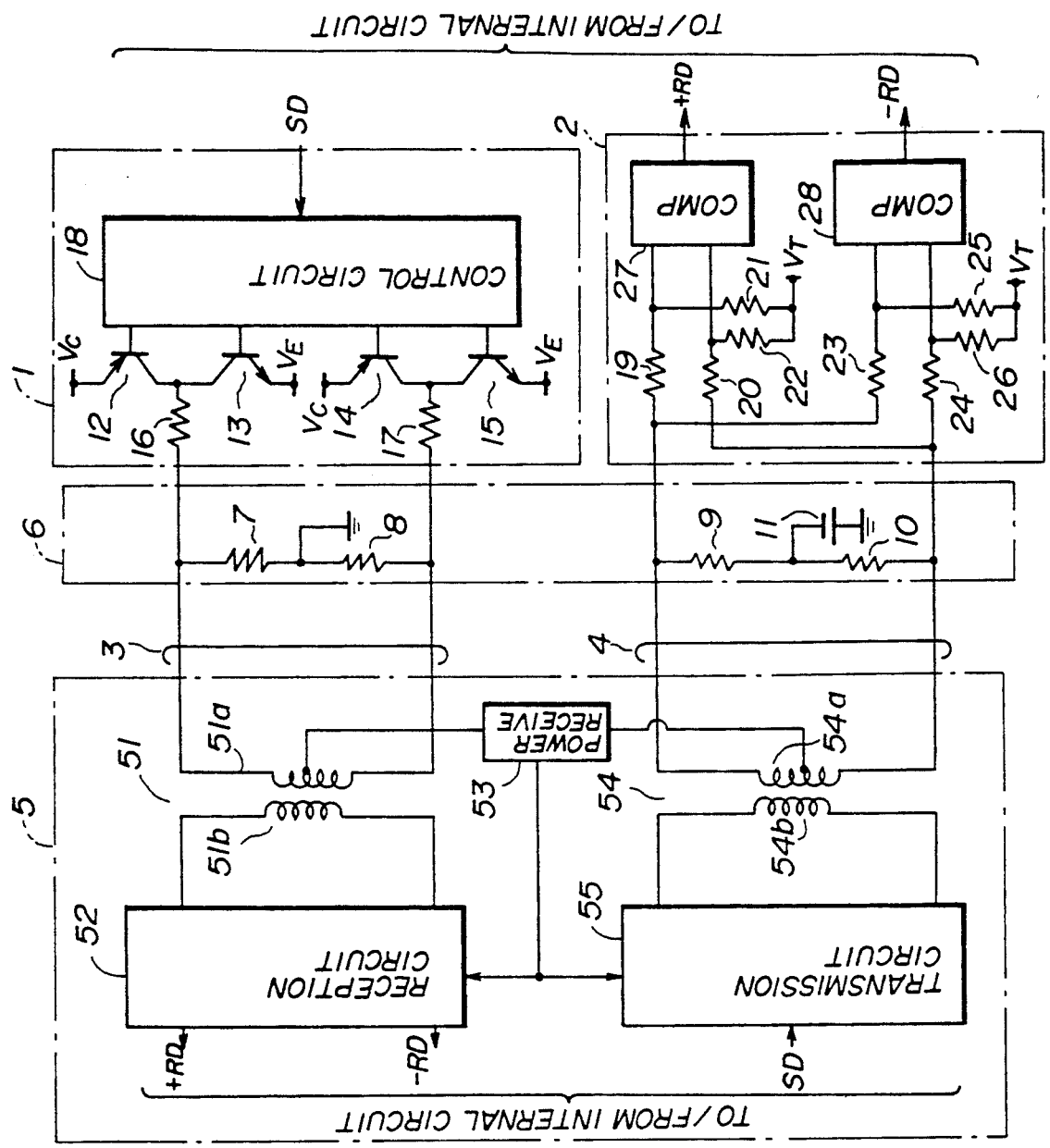
FIG. 3 is a block diagram of an ISDN interface circuit according to a preferred embodiment of the present invention and an example of the structure of a terminal device.

FIG. 3 shows an example of the structure of the terminal device 5. As shown, the terminal device 5 includes a reception transformer 51, a reception circuit 52, a power receiving circuit 53, a transmission transformer 54, and a transmission circuit 55. The transmission line 3 is connected to a primary winding 51a of the reception transformer 51, and a secondary winding 51b of which is connected to the reception circuit 52. The reception line 4 is connected to a secondary winding 54a of the reception transformer 54, and a primary winding 54b of the reception transformer 54 is connected to the transmission circuit 55. The power receiving circuit 53 is connected between an intermediate point of the primary winding 51a and an intermediate point of the secondary winding 54a, and supplies received power to the reception circuit 52 and the transmission circuit 55. The reception circuit 52 is configured in the same way as the reception circuit 2, and the transmission circuit 55 is configured in the same way as the transmission circuit 1. The reception circuit 52 receives the transmission data SD sent by the ISDN interface circuit, and outputs the positive and negative pulse detection signals $+RD$ and $-RD$ to an internal circuit (not shown). The transmission circuit 55 receives transmission data SD from the internal circuit and outputs it to the reception line 4 via the transmission transformer 54.

Figure 4A:
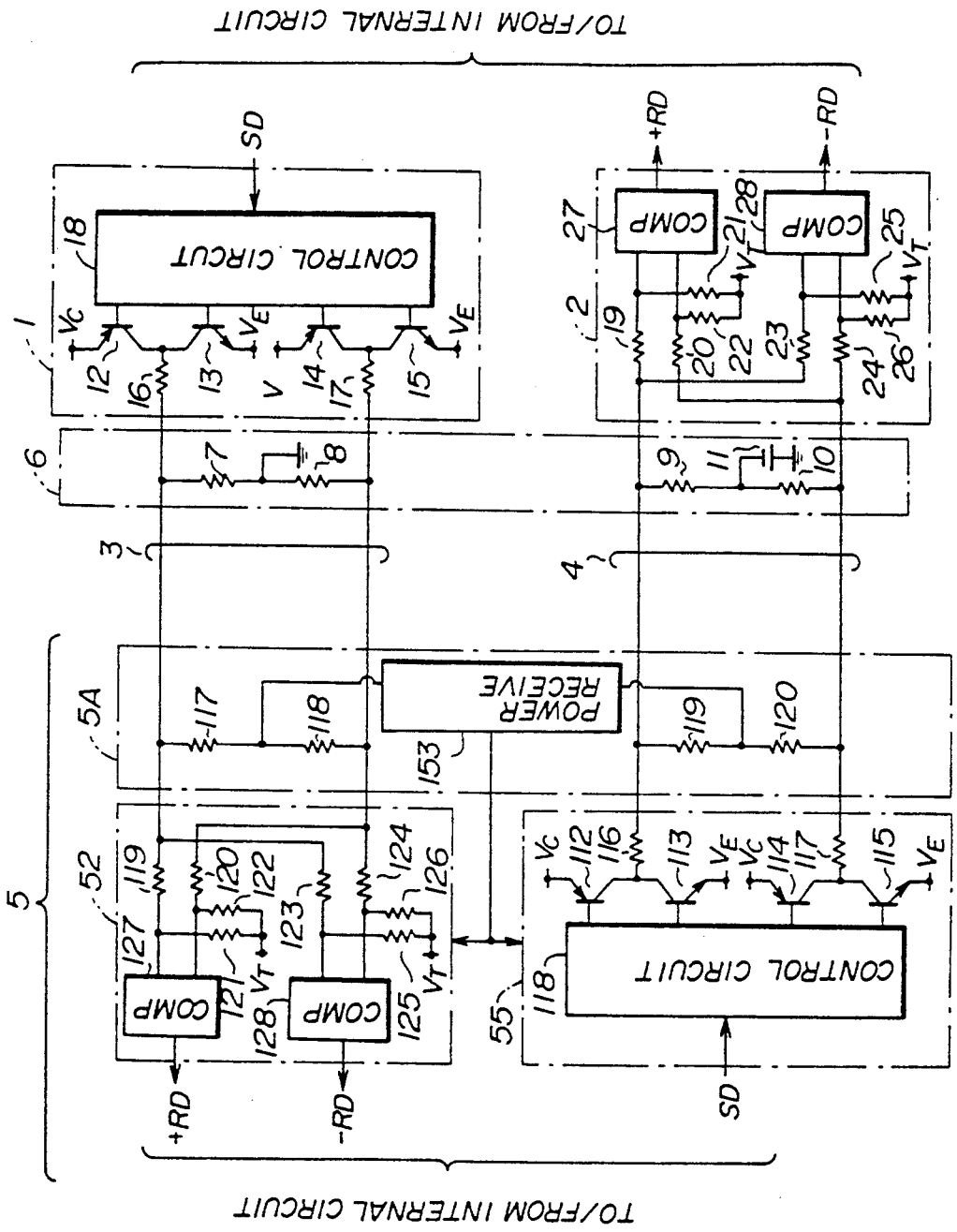
FIG. 4A is a block diagram of the ISDN interface circuit according to the preferred embodiment of the present invention an another example of the structure of the terminal device.

FIG. 4A shows another example of the structure of the terminal device 5. The terminal device 5 shown in FIG. 4A has a power receiving block 5A, which is composed of resistors 117–120, and a power receiving circuit 153. It will be noted that the transmission transformer 51 and the reception transformer 54 are replaced by the resistors 117–120. The resistors 117 and 118 are connected in series between the two wires of the transmission line 3. Similarly, the resistors 119 and 120 are connected in series between the two wires of the reception line 4. The power receiving circuit 153 is connected between a connection node at which the resistors 117 and 118 are connected in series and a connection node at which the resistors 119 and 120 are connected in series.

Figure 4B:
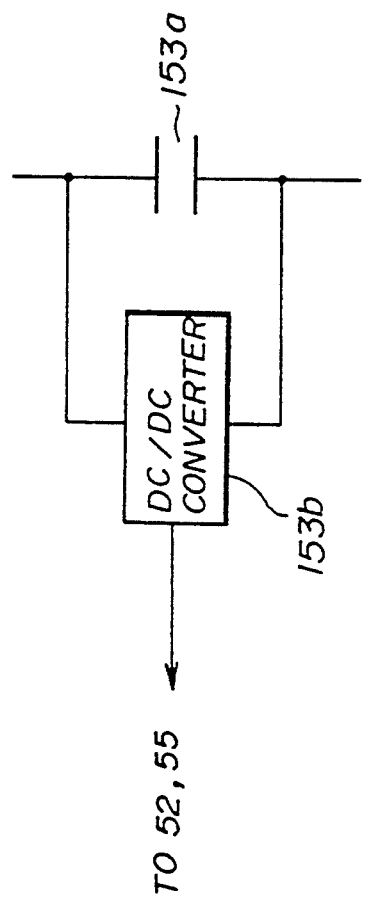
FIG. 4B is a block diagram of a power receiving circuit shown in FIG. 4A.

As shown in FIG. 4B, the power receiving circuit 153a is made up of, for example, a capacitor 153 and a DC/DC converter 153b. The current from the connection node of the resistors 117 and 118 passes through the capacitor 153a, so that it is charged. The DC/DC converter 153b generates D.C. power from the charge stored in the capacitor 153a. The D.C. power thus generated is applied to the reception circuit 52 and the transmission circuit 55.

Returning to FIG. 4A, the reception circuit 52 is the same as the reception circuit 2 of the ISDN interface circuit. More specifically, the reception circuit 52 has resistors 119–126, and two comparators 127 and 128. The transmission circuit 55 is the same as the transmission circuit 1 of the ISDN interface circuit. More specifically, the transmission circuit 55 has driving transistors 112–115, and a control circuit 118.

Figure 2:
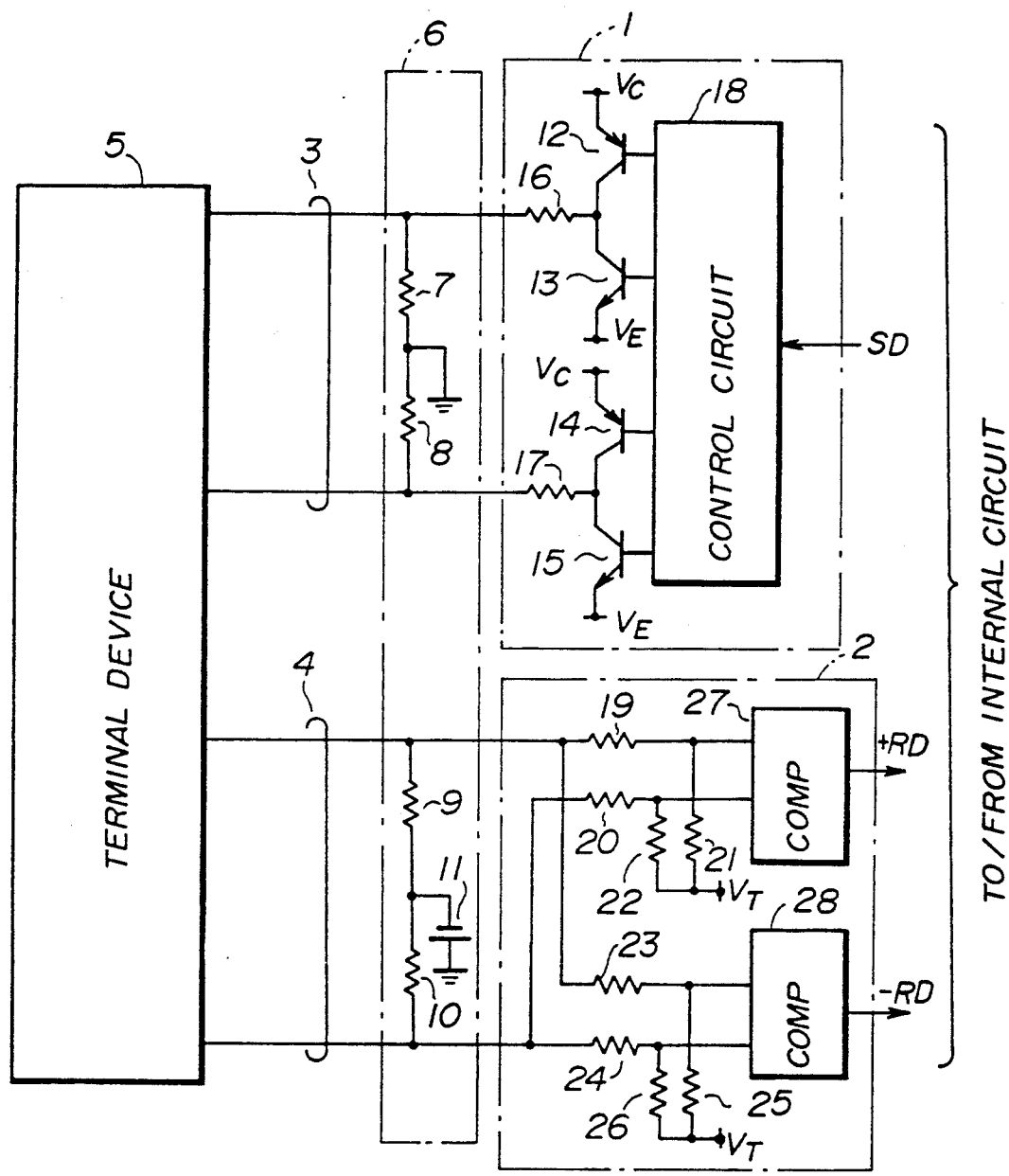
FIG. 2 is a block diagram illustrating the principle of the present invention.
Figure 5:
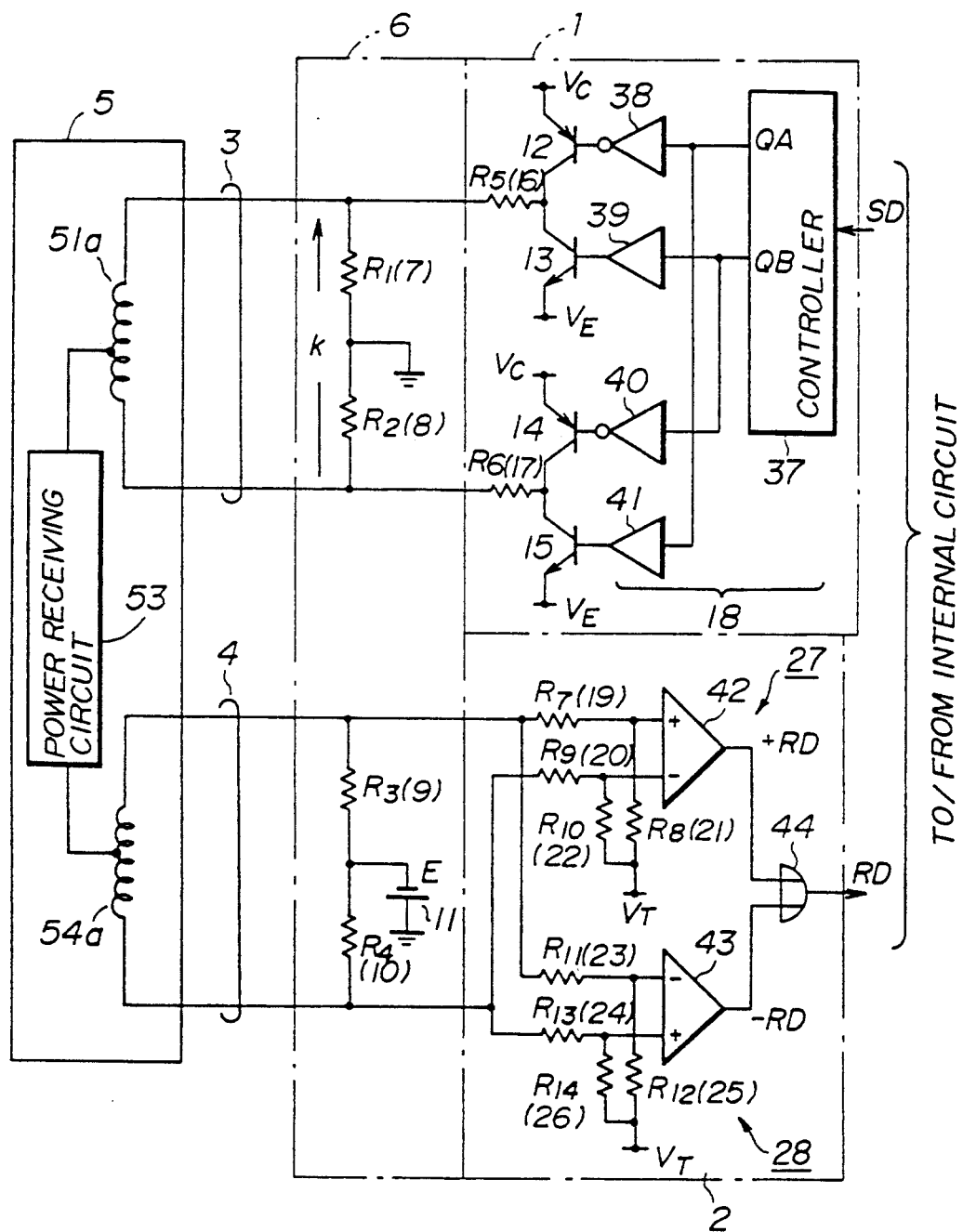
FIG. 5 is circuit diagram illustrating the structure shown in FIG. 2 in more detail.

FIG. 5 shows the control circuit 18 and the comparators 27 and 28, of FIGS. 2, 3 and 4A, in more detail. The control circuit 18 is made up of a controller 37, two inverting drivers 38 and 40, and two drivers 39 and 41. The controller 37 has an input terminal which receives transmission data SD from the internal circuit, and two output terminals QA and QB. The output terminal QA is connected to the base of the driving transistor 12 via the inverting driver 38 and the base of the driving transistor 15 via the driver 41. The output terminal QB is connected to the base of the driving transistor 13 via the driver 39 and the base of the driving transistor 14 via the inverting driver 40, as has been described previously. The pnp driving transistor 12 and the npn driving transistor 13 form a complementary type driving circuit, and the pnp driving transistor 14 and the npn driving transistor 15 form a complementary type driving circuit. It will be noted that R1, R2, R3 and R4 represent the resistance values of the resistors 7, 8, 9 and 10, respectively and R5, R6, R7, R8, R9, R10, R11, R12, R13 and R14 represent the resistance values of the resistors 16, 17, 19, 21, 20, 22, 23, 25, 24 and 26, respectively.

The comparator 27 is formed of a differential amplifier 42, and the comparator 28 is formed of a differential amplifier 43. An OR gate 44 receives the positive pulse detection signal $+RD$ and the negative pulse detection signal $-RD$, and outputs the corresponding one thereof as the received data detection signal RD.

The D.C. power source 11 is formed of a $-40$ V D.C. power source. The connection node of the resistors 9 and 10 is set to $-40$ volts with respect to the ground level. When the terminating resistance is equal to, for example, 100 ohms, $R1=R2=R3=R4=50$ ohms.

When the transmission data SD is "1"", both the output terminals QA and QB of the controller 37 are set to "0", so that all the driving transistors 12–15 are OFF. On the other hand, when the transmission data SD is "0", the output terminal QA of the controller 37 is set to, for example, "1", so that the driving transistor 12 is turned ON, and the driving transistor 15 is turned ON. A voltage equal to $[R1/(R1+R5)]V_C$ is applied to one of the two wires of the transmission line 3, and a voltage equal to $[R2/(R2+R6)]V_E$ is applied to the other wire of the transmission line 3. Thus, the following voltage is applied across the primary winding 51a of the reception transistor 51 of the terminal device 5:

$$|[R1/(R1+R5)]V_C - [R2/(R2+R6)]V_E|. \quad (1)$$

When the transmission data is "O" and the output terminal QB of the controller 37 is set to "1"", the driving transistor 13 is turned ON, and the driving transistor 14 is turned ON. Thus, a voltage equal to $[R1/(R1+R5)]V_3$ is applied to one of the two wires of the transmission line 3, and a voltage equal to $[R2/(R2+R6)]V_C$ is applied to the other wire of the transmission line 3. Thus, the following voltage is applied across the primary winding 51a of the reception transistor 51 of the terminal device 5:

$$|[R2/(R2+R6)]V_C - [R1/(R1+R5)]V_3|. \quad (2)$$

In the above-mentioned way, positive and negative pulses are generated and output to the transmission line 3.

The positive and negative pulses output via the secondary winding 54a of the transmission transformer 54 are sent to the reception circuit 2 via the reception line 4. The resistors 19-25 divide the differences between the voltages of the two wires of the reception line 4 and the reference voltage $V_T$, so that voltages to be compared with each other by the comparator 42 and voltages to be compared with each other by the comparator 43 are generated. The non-inverting input terminal of the comparator 42 receives an input voltage larger than that received by the inverting input terminal thereof when a positive pulse is received. Thus, the comparator 42 outputs "1"". On the other hand, when a negative pulse is received, the inverting input terminal of the comparator 43 receives an input voltage smaller than that applied to its non-inverting terminal. Thus, the comparator 43 outputs "1"". If transmission data "O" is transmitted by positive and negative pulses as in the case of the transmission circuit 3, the output signal of the OR circuit 44 may be inverted by an inverter (not shown).

Figure 6:
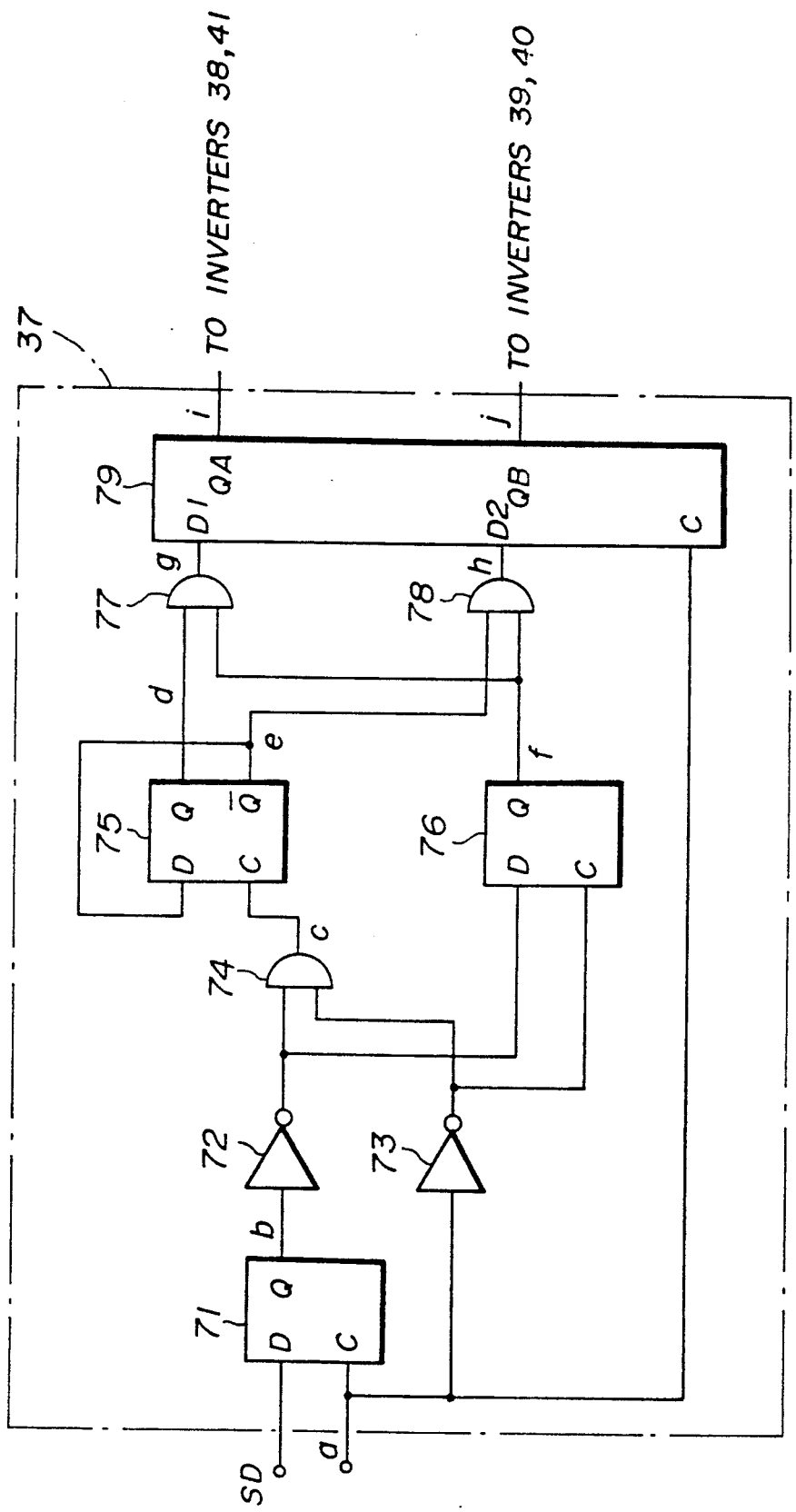
FIG. 6 is a circuit diagram of a controller shown in FIG. 5.
Figure 7:
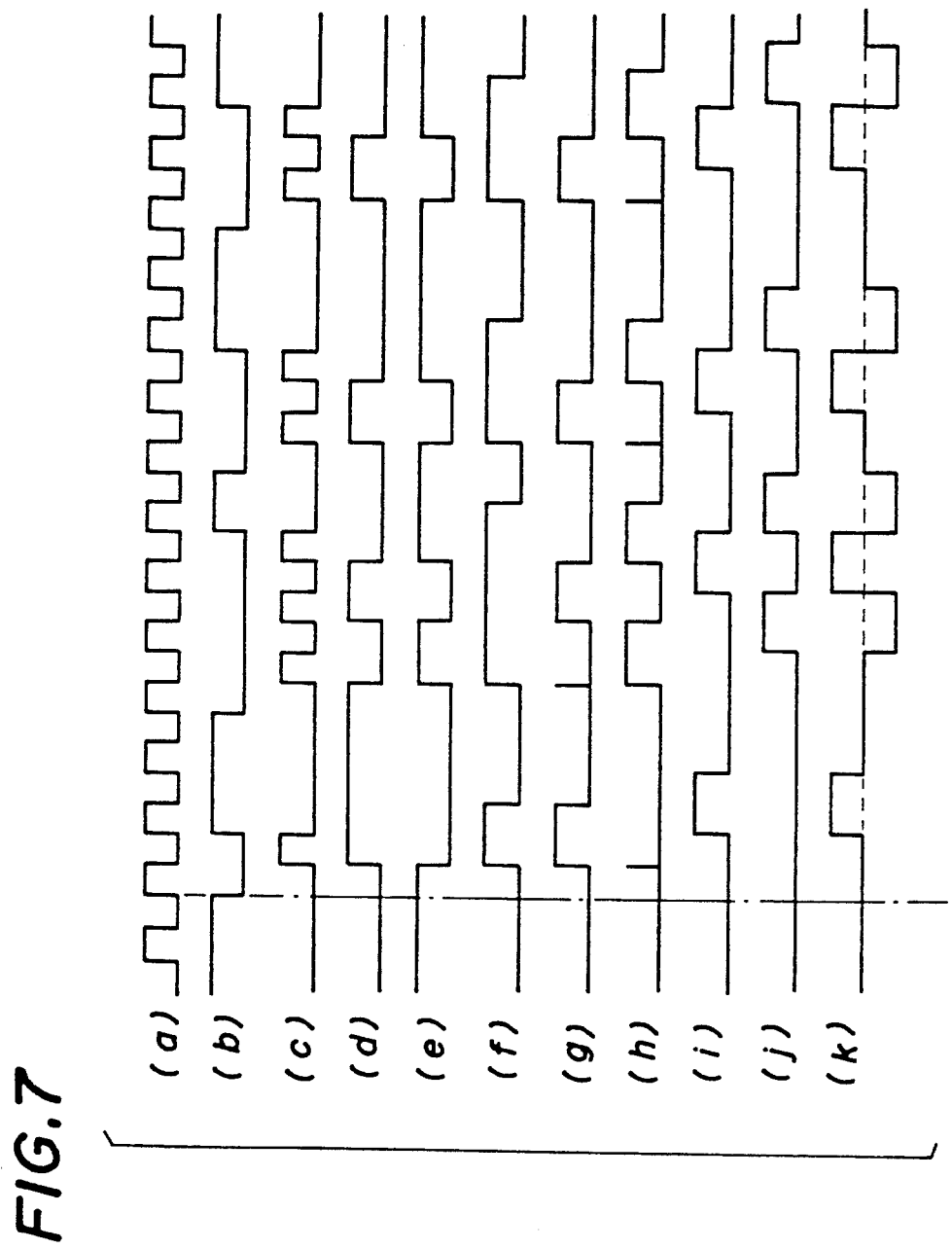
FIG. 7 is a waveform diagram illustrating the operation of the controller shown in FIG. 6.

FIG. 6 is a circuit diagram of the controller 37 shown in FIG. 5. As shown, the controller 37 includes D-type flip-flops 71, 75 and 76, inverters 72 and 73, AND circuits 74, 77 and 78, a latch circuit 79. FIG. 7 is a waveform diagrams showing signals obtained at parts (a)–(j) shown in FIG. 6 and a signal obtained at part (k) shown in FIG. 5.

A clock signal from the internal circuit (not shown) of the ISDN interface circuit is applied to clock terminals C of the flip-flop 71 and the latch circuit 79. The clock signal passes through the inverter 73, and an inverted version of the clock signal is applied to a clock terminal C of the flip-flop 75 through the AND circuit 74 and applied to a clock terminal C of the flip-flop 76. The transmission data output by the internal circuit is input to a data terminal D of the flip-flop 71. A signal shown in FIG. 7-(b) is output via an output terminal Q of the flip-flop 71.

The AND gate 74 receives the inverted version of the clock signal and an inverted version of the signal from the output terminal Q of the flip-flop 71, and outputs a signal shown in FIG. 7-(c), which is applied to a clock terminal C of the flip-flop 75. The flip-flop 75 outputs signals shown in FIG. 7-(d) and FIG. 7-(e) via its output terminals Q and $\overline{Q}$, respectively. The inverted version of the signal from the flip-flop 71 is input to a data input terminal D of the flip-flop 76, which outputs the signal shown in FIG. 7-(f) via its output terminal Q.

The signal from the output terminal Q of the flip-flop 75 and the signal from the output terminal Q of the flip-flop 76 are input to the AND circuit 77. The signal from the output terminal $\overline{Q}$ of the flip-flop 75 and the signal from the output terminal Q of the flip-flop 76 are input to the AND circuit 78. The AND circuit 77 outputs a signal shown in FIG. 7-(g), and the AND circuit 78 outputs a signal shown in FIG. 7-(h). In response to these signals, the latch circuit 79 outputs signals shown in FIG. 7-(i) and FIG. 7-(j) via the output terminals QA and QB, respectively. The signals output via the output terminals QA and QB (non-return-to-zero signals) control the driving transistors 12-15 through the drivers 38-41 in the aforementioned way, so that an AMI signal shown in FIG. 7-(k) is transmitted to the terminal device 5 via the transmission line 3.

The present invention is not limited to the specifically disclosed embodiments, and variations and modifications may be made without departing from the scope of the present invention.

What is claimed is:

1. An ISDN interface circuit coupled to a terminal device via a transmission line and a reception line, said transmission line being formed of a pair of first and second wires, and said reception line being formed of a pair of third and fourth wires, said ISDN interface circuit comprising:

transmission/reception means coupled to said transmission line and said reception line, for sending transmission data to said terminal device via said transmission line and for receiving data sent from said terminal device via said reaction line, said first transmission/reception means further comprising:

first driving means for driving said first wire of said transmission line in accordance with transmission data and further comprising a first transistor having a base, a first terminal connectable to receive a first power supply voltage and a second terminal coupled to said first wire of said transmission line, and a second transistor having a base, a first terminal coupled to said first wire of said transmission line and a second terminal connectable to receive a second power supply voltage smaller than said first power supply voltage, and second driving means for driving said second wire of said transmission line in accordance with said transmission data and further comprising a third transistor having a base, a first terminal connectable to receive said first power supply voltage and a second terminal coupled to said second wire of said transmission line, and a fourth transistor having a base, a first terminal coupled to said second wire of said transmission line and a second terminal connectable to receive said second power supply voltage; a power feed circuit comprising:

a first resistor and a second resistor connected in series at a first node and between said first and second wires of said transmission line, a third resistor and a fourth resistor connected in series at a second node and between said third and fourth wires of said reception line, a D.C. power source connected to one of said first node at which said first resistor and said second resistor are mutually connected in series and said second node at which said third resistor and said fourth resistor are mutually connected in series, one of said first node and said second node, other than said one of said first node and said second node connected to said D.C. power source, being grounded; and control means, coupled to the bases of said first, second, third and fourth transistors, for controlling said first, second, third and fourth transistors in accordance with said transmission data.

2. An ISDN interface circuit as claimed in claim 1, wherein said first, second, third and fourth resistors have respective, identical resistance values.

3. An ISDN interface circuit as claimed in claim 1, wherein said first, second third and fourth resistors each have a resistance value which is substantially equal to half of a predetermined line terminating resistance value.

4. An ISDN interface circuit as claimed in claim 1, wherein said control means comprises:

controller means for generating a first signal and a second signal from said transmission data;

a first driver which drives said first transistor by applying an inverted version of said first signal to the base of said first transistor;

a second driver which drives said second transistor by applying said second signal to the base of said second transistor;

a third driver which drives said third transistors by applying an inverted version of said second signal to the base of said third transistor; and a fourth driver which drives said fourth transistor by applying said first signal to the base of said fourth transistor.

5. An ISDN interface circuit as claimed in claim 1, further comprising:

a fifth resistor coupling said first wire of said transmission line to said second terminal of said first transistor and said first terminal of said second transistor; and a sixth resistor coupling said second wire of said transmission line to said second terminal of said third transistor and said first terminal of said fourth transistor.

6. An ISDN interface circuit as claimed in claim 1, wherein said transmission/reception means comprises:

first detecting means for detecting a positive pulse received via said reception line; and second detecting means for detecting a negative pulse received via said reception line.

7. An ISDN interface circuit coupled to a terminal device via a transmission line and a reception line, said transmission line being formed of a pair of first and second wires, and said reception line being formed of a pair of third and fourth wires, said ISDN interface circuit comprising:

a power feed circuit coupled to said transmission line and said reception line and comprising:

a first resistor and a second resistor connected in series at a first node and between said first and second wires of said transmission line, a third resistor and a fourth resistor connected in series at a second node and between said third and fourth wires of said reception line, and a D.C. power source connected to one of said first node at which said first resistor and said second resistor are mutually connected in series and said second node at which said third resistor and said fourth resistor are mutually connected in series, one of said first node and said second node, other than said one of said first node and said second node connected to said D.C. power source, being grounded; and transmission/reception means, coupled to said transmission line and said reception line, for sending transmission data to said terminal device via said transmission line and for receiving data sent from said terminal device via said reception line, and comprising;

means for supplying a reference voltage;

a first resistor network which divides the difference voltage between the voltage of said third wire of said reception line and the reference voltage and generates a first divided voltage, a second resistor network which divides the difference voltage between the voltage of said third wire of said reception line and said reference voltage and generates a second divided voltage, a third resistor network which divides the difference voltage between the voltage of said fourth wire of said reception line and said reference voltage and generates a third divided voltage, a fourth resistor network which divides the difference ence voltage between the voltage of said fourth wire of said reception line and said reference voltage and generates a fourth divided voltage, first comparing means for comparing said first divided voltage and said third divided voltage thereby to detect positive pulse received via said reception line and, in response thereto, for generating a first detection signal, and second comparing means for comparing said second divided voltage and said fourth divided voltage thereby to detect a negative pulse received via said reception line and, in response thereto, for generating a second detection signal.

8. An ISDN interface circuit as claimed in claim 7, wherein said transmission/reception means further comprises an OR circuit which receives said first detection signal and said second detection signal and which outputs a result of an OR operation thereon.

9. A system having an ISDN interface circuit and a terminal device, said ISDN interface circuit being coupled to said terminal device via a transmission line and a reception line, said transmission line being formed of a pair of first and second wires and said reception line being formed of a pair of third and fourth wires, wherein: said ISDN interface circuit comprises:

a first resistor and a second resistor connected in series at a first node and between said first and second wires of said transmission line, a third resistor and a fourth resistor connected in series at a second node and between said third and fourth wires of said reception line, and a D.C. power source connected to one of said first node at which said first resistor and said second resistor are mutually connected in series and a second node at which said third resistor and said fourth resistor are mutually connected in series, one of said first node and said second node, other than said one of said first node and said second node connected to said D.C. power source, being grounded; and said terminal device comprises an internal circuit and power receiving means, coupled to said transmission line and said reception line, for receiving power supplied from said ISDN interface circuit via said transmission line and for outputting said power to an internal circuit of said terminal device, said power receiving means further comprising:

a fifth resistor and a sixth resistor connected in series at a third node and between said first and second wires of said transmission line, a seventh resistor and an eighth resistor connected in series at a fourth node and between said third and fourth wires of said reception line, a capacitor connected between said third node at which said fifth resistor and said sixth resistor are mutually connected in series and said fourth node at which said seventh resistor and said eighth resistor are mutually connected in series, and converter means of generating said power from a charge stored in said capacitor.

10. A system as claimed in claim 9, wherein said first, second, third and fourth resistors each have an identical resistance.

11. A system as claimed in claim 9, wherein said first, second, third and fourth resistors each have a resistance equal to half a predetermined line terminating resistance.

12. A system as claimed in claim 9, further comprising transmission/reception means, coupled to said transmission line and said reception line, for sending transmission data to said terminal device via said transmission line and for receiving data sent from said terminal device via said reception line.

* * * * *

UNITED STATES PATENT AND TRADEMARK OFFICE
CERTIFICATE OF CORRECTION

PATENT NO. : 5,311,518
DATED : May 10, 1994
INVENTOR(S) : Kenji TAKATO et al.

It is certified that error appears in the above-indentified patent and that said Letters Patent is hereby corrected as shown below:

On the Cover Page, [57] Abstract, line 14, after "series" insert --,--.

Col. 4, line 39, after "4" insert --is--.

Col. 6, line 48, before "|" (first occurrence), equation (1), insert $--V_{51a}=--$;
line 54, change "$V_3$" to $--V_E--$;
line 61, before "|" (first occurrence), equation (2), insert $--V_{51a}=--$.

Col. 10, line 21, insert a paragraph break after "wherein:" and before "said".

Signed and Sealed this

Eleventh Day of October, 1994

Attest:

BRUCE LEHMAN

*Attesting Officer*     *Commissioner of Patents and Trademarks*